United States Patent [19]

Henderson et al.

[11] Patent Number: 5,398,082
[45] Date of Patent: Mar. 14, 1995

[54] SCANNED ILLUMINATION FOR LIGHT VALVE VIDEO PROJECTORS

[75] Inventors: Alan R. Henderson, Carlsbad, Calif.; Richard M. Filia, Portland, Oreg.

[73] Assignee: Hughes-JVC Technology Corporation, Carlsbad, Calif.

[21] Appl. No.: 64,842

[22] Filed: May 20, 1993

[51] Int. Cl.6 .................. H04N 3/06; H04N 3/08; H04N 3/00
[52] U.S. Cl. .................. 348/781; 348/782; 348/761; 348/764; 359/45; 359/210; 353/31
[58] Field of Search .................. 358/60, 61, 62, 63, 358/64, 58, 55, 231, 232, 233, 234, 236, 237, 199, 200, 202, 205, 206, 207, 208; H04N 3/06, 3/08, 3/00, 5/74, 9/14, 9/31; 359/40, 45, 209–211, 216; 353/31, 38, 100–102; 348/195–197, 199, 201, 202–205, 762, 760, 761, 759, 766, 767, 768, 781, 782, 743, 742, 744, 786, 792, 791, 790, 832, 835, 751–753, 755, 756, 763, 764, 770, 771, 776, 779

[56] References Cited

U.S. PATENT DOCUMENTS

| | | | |
|---|---|---|---|
| 1,544,156 | 6/1925 | Jenkins | 358/205 |
| 2,064,475 | 12/1936 | Ives | 358/205 |
| 2,588,740 | 3/1952 | Malm | 358/231 |
| 2,605,352 | 7/1952 | Fischer | 358/234 |
| 2,958,783 | 11/1960 | Taylor | 359/211 |
| 2,976,362 | 3/1961 | Stamps | 359/211 |
| 3,107,070 | 10/1963 | Willits et al. | 359/209 |
| 4,127,322 | 11/1978 | Jacobson et al. | 353/31 |
| 4,191,456 | 3/1980 | Hong et al. | 353/31 |
| 4,268,110 | 5/1981 | Ford | 359/211 |
| 4,343,535 | 8/1982 | Bleha, Jr. | 350/342 |
| 4,611,245 | 9/1986 | Trias | 358/60 |
| 4,641,038 | 2/1987 | Baker | 359/211 |
| 4,641,192 | 2/1987 | Diepeveen et al. | 358/206 |
| 4,650,296 | 3/1987 | Tsuchiya | 350/519 |
| 4,751,509 | 6/1988 | Kubota et al. | 359/45 |
| 5,192,946 | 3/1993 | Thompson et al. | 358/62 |

Primary Examiner—James J. Groody
Assistant Examiner—Safet Metjahic
Attorney, Agent, or Firm—Harness, Dickey & Pierce

[57] ABSTRACT

A video projection system employs a reflective light valve (10) that is optically addressed by an image from a cathode ray tube (12) and provides an output image for projection by means of a high intensity reading light directed to the output face of the liquid crystal light valve. Improved reading illumination is provided by scanning the face of the liquid crystal light valve (10) with a narrow beam of light (80) that moves across the liquid crystal in synchronism with the scanning image from the writing CRT (12). The scanned narrow band (80) of illumination is provided by a circular sequence of three quasi cylindrical lens (56, 58, 60) or mirrors (56a, 58a, 60a) mounted on a rotating wheel (52) and which may be made of sequentially different colors to provide a color display. Rotation of the lens or mirror bearing wheel (52) is synchronized with the vertical sync of the CRT scan, as are the index positions of each of the three lens or mirror segments on the wheel.

31 Claims, 5 Drawing Sheets

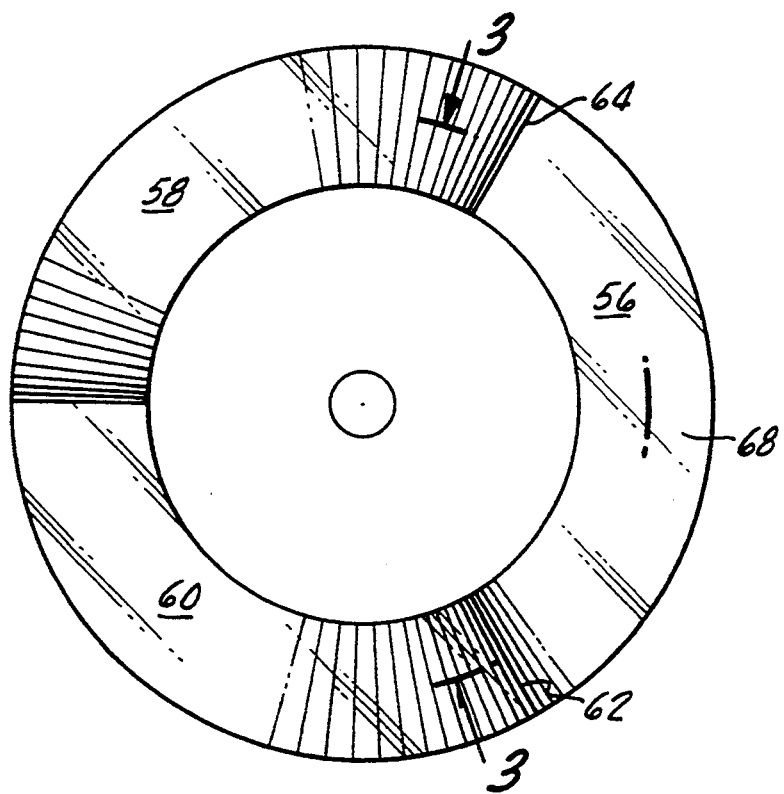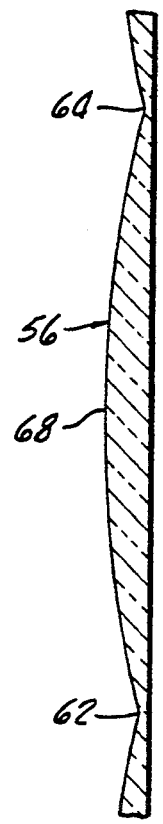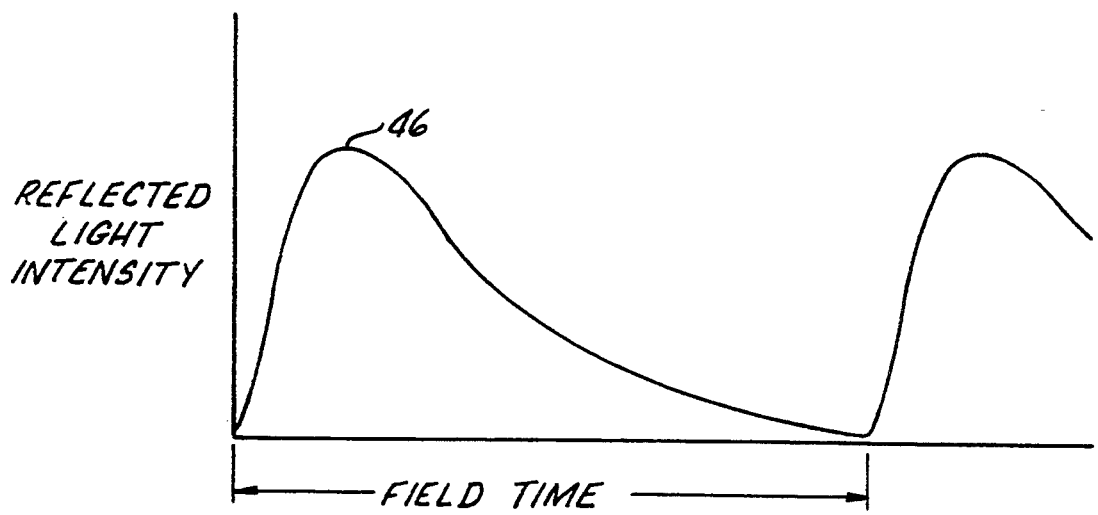
FIG. 2.
FIG. 3.
FIG. 6.

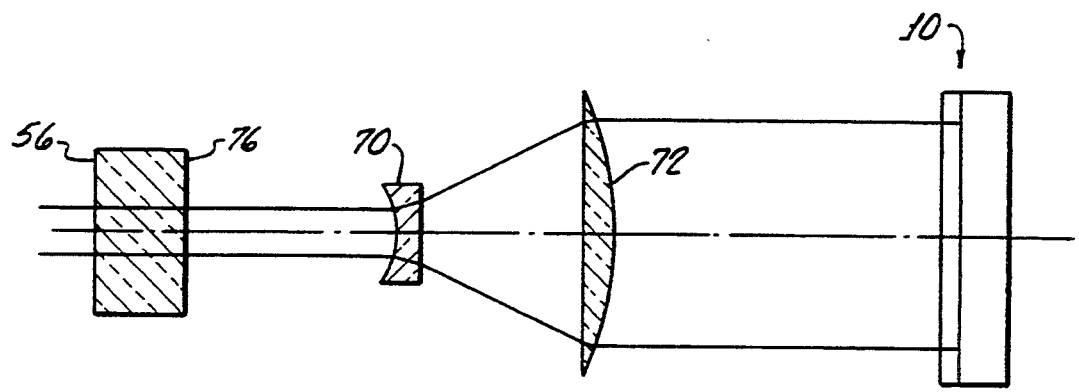
_Fig. 4._
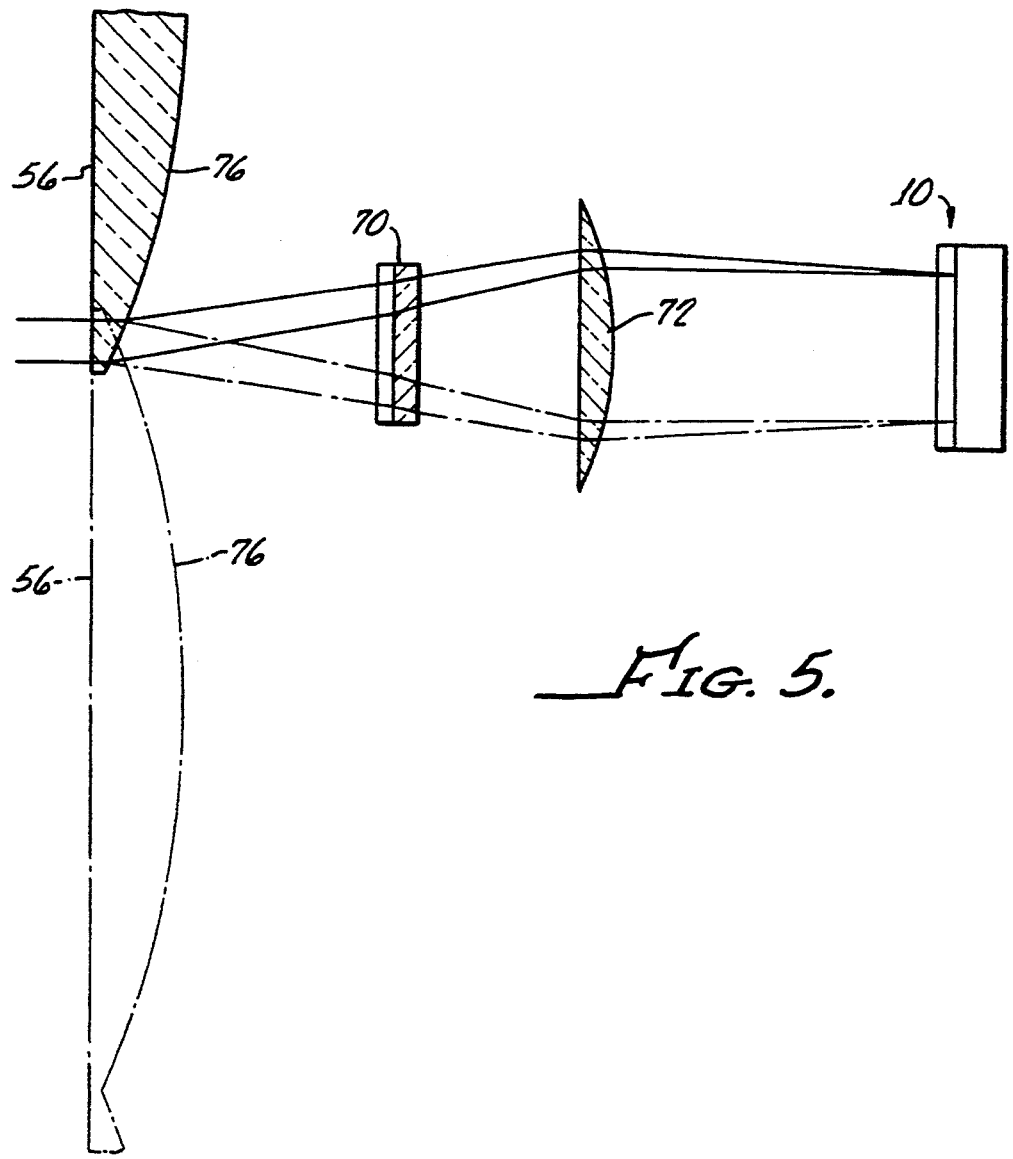
_Fig. 5._

SCANNED ILLUMINATION FOR LIGHT VALVE VIDEO PROJECTORS

BACKGROUND OF THE INVENTION

1. Field of the Invention

The present invention relates to reflective light valve projection systems and more particularly concerns improved reading light for such a system.

2. Description of Related Art

The liquid crystal light valve (LCLV) is a thin film, multi-layer structure comprising a liquid crystal layer, a dielectric mirror, a light blocking layer and a photosensitive layer, all sandwiched between two transparent electrodes. In a reflective liquid crystal light valve projection system, a polarized projection (reading) beam is directed through the liquid crystal layer to the dielectric mirror, which reflects it back through the liquid crystal layer. The LCLV is optically addressed by an input image of low intensity light, such as that generated by a cathode ray tube, which is applied to the photosensitive layer. Impedance of the photosensitive layer is lowered in proportion to intensity of incident writing light, resulting in a spatially varying impedance pattern. This results in a corresponding increase in voltage dropped across the liquid crystal layer in a spatially varying pattern matching the incident writing image. Tilt of the liquid crystal molecules in a particular region, and therefore the birefringence seen by the reading light passing through the region, is directly dependent on voltage dropped across the liquid crystal layer. To read the birefringence pattern, a fixed beam of linearly polarized projection light from a high power light source floods the output face of the liquid crystal layer, passes through the liquid crystal layer and is reflected from the dielectric mirror to be polarization modulated in accordance with the input (writing) light information incident on the photosensitive layer. Therefore, if a complex distribution of light, for example a high resolution input image from the cathode ray tube, is focused on the photosensitive surface, the device converts the relatively low intensity input image into a high intensity replica image which can be reflected for projection with magnification to produce a high brightness image on a large viewing screen.

Projection systems of this type are described in several U.S. Patents, including U.S. Pat. Nos. 4,650,296 to Koda et al for Liquid Crystal Light Valve Color Projector, 4,343,535 to Bleha, Jr. for Liquid Crystal Light Valve, 4,127,322 to Jacobsend et al for High Brightness Full Color Image Light Valve Projection System, and 4,191,456 to Hong, et al for Optical Block for High Brightness Full Color Video Projection System.

In the liquid crystal light valve projection system a significant amount of power is used by the high intensity light source. In the prior art, the light source provides a fixed area reading illumination that covers the entire area of liquid crystal. This high intensity reading light is not employed with optimum efficiency nor optimum contrast. In present systems the incoming reading light beam frequently has a circular area, whereas the active area of the liquid crystal light valve has a rectangular configuration with an aspect ratio, for example, in the order of 16:9 in some systems. Therefore significant parts of the reading light are wasted because they fall on inactive areas. Further, as the liquid crystal light valve is optically addressed in a rectangular raster scan (by a standard CRT scan), a major amount of reading illumination continues to impinge upon various areas of the liquid crystal after a line of information of the raster scan has been written. The effect of the optically written input information, which is written line by line in the conventional raster scan, decreases with time after the individual line is energized. Consequently, continued application of high power, high intensity reading light decreases in efficiency with time following the writing of the input information. In many projectors, maximum allowable light input intensity is limited by allowable light valve temperatures so that the overall output intensity may be limited unnecessarily by inefficient use of the high intensity reading light.

Accordingly, it is an Object of the present invention to provide a liquid crystal light valve projection system which avoids or minimizes above mentioned problems.

SUMMARY OF THE INVENTION

In carrying out principles of the present invention in accordance with a preferred embodiment thereof a liquid crystal light valve, which is optically addressed by an input write beam that scans the area of the liquid crystal, is provided with a high intensity reading light that illuminates only part of the active area of the liquid crystal. The illuminated area is caused to scan over the entire liquid crystal active area in synchronism with the writing scan. For use with a conventional rectangular raster input scan the reading light is provided as a band of high intensity light that scans in synchronism with the input scan. In a particular embodiment the scanning reading light is provided by a train of quasi cylindrical light bending elements that are sequentially interposed between the high intensity reading light source and the liquid crystal. Preferably the quasi cylindrical light bending elements are mounted on a circular wheel which rotates to sequentially interpose the bending elements between the light source and the liquid crystal to cause a narrow elongated band of light to scan in synchronism with the input scan.

BRIEF DESCRIPTION OF THE DRAWINGS

In the accompanying drawings:

FIG. 2 is a plan view of a lens element bearing wheel;

FIG. 3 illustrates the configuration of a single lens element;

FIGS. 4 and 5 schematically illustrate a top view and a side view of the light path through and from the light bending element;

FIG. 6 graphically illustrates a temporal variation of output light intensity in a liquid crystal light valve having fixed illumination of the prior art;

DESCRIPTION OF THE PREFERRED EMBODIMENT

Figure 1:
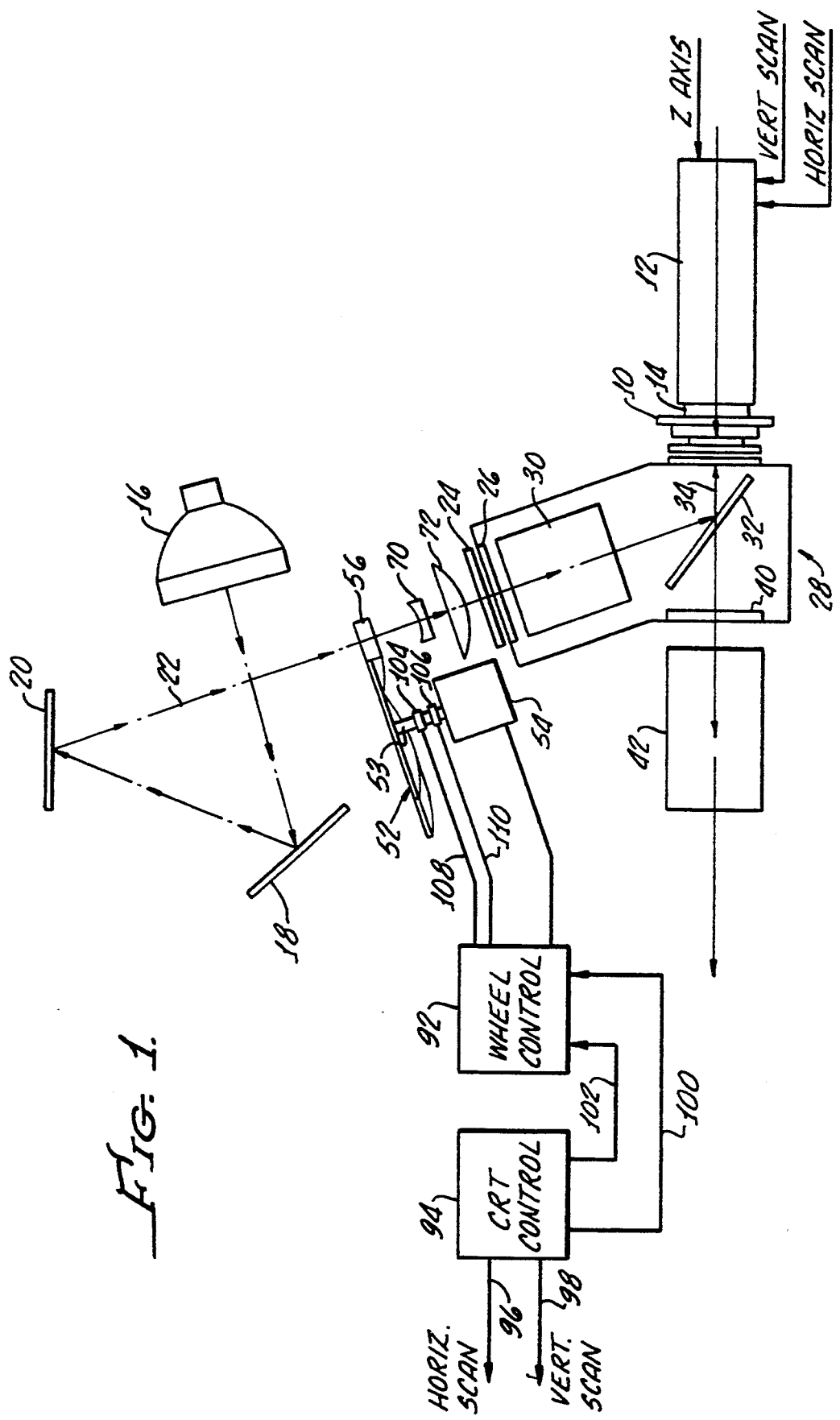
FIG. 1 illustrates basic components of a liquid crystal light valve projector having improved reading illumination according to one embodiment of the present invention.

Schematically illustrated in FIG. 1 are components of a known liquid crystal light valve projector which is modified to incorporate scanned illumination of reading light according to one embodiment of the present invention. The projector first will be described as it would be without the components of the present invention. A liquid crystal module 10 is optically addressed by an image provided from a cathode ray tube 12 via a fused fiber optic face plate 14. A high intensity xenon arc lamp 16 provides reading light which is reflected from first and second cold mirrors 18,20 and transmitted along a path 22 through an ultraviolet filter 24 to an input window 26 of a light polarizing prism 28 having a pre-polarizer filter 30 and a reflecting/transmitting polarization mirror, such as a MacNeille prism 32. Projector components of the present invention, including elements 50, 52, 54, 56, 70 and 72, which are positioned between cold mirror 20 and the ultraviolet filter 24 at prism window 26, are temporarily ignored in initial discussion of projector operation. Polarized light strikes the MacNeille prism 32, which transmits light of one polarization state and reflects light of a second polarization state. Light reflected from prism 32 travels along path 34 to the output face of the liquid crystal module. This is the reading light that is reflected from the liquid crystal module. Intensity of the reflected reading light varies spatially over the face of the liquid crystal in accordance with spatial variations of intensity of the optical image that is applied as a writing input from the cathode ray tube and its fused fiber optic face plate 14. Briefly, those areas of the liquid crystal light valve that receive light from the cathode ray tube reflect the high intensity reading light with a polarization that allows the reflected light to be transmitted through the MacNeille prism and through an output window 40 of the prism to a projection lens 42 for projection on a suitable screen (not shown). Areas of the liquid crystal that are dark, e.g. those that receive no input illumination, reflect light with unchanged polarization state, which accordingly cannot pass through the MacNeille prism 32, and which is thus reflected by the prism 32 out of the system. Consequently, a high intensity image of the low intensity input light from the cathode ray tube is reflected from the liquid crystal to the projection lens for projection.

In the past, the reading light provided from the arc lamp, the mirrors and pre-polarizer filter has had a fixed area, steady state beam that illuminates the entire face (and more) of the liquid crystal module. The latter has an active area that may be of various dimensions, and in some typical embodiments may be of a circular configuration of approximately two inches in diameter or less, or may have a rectangular configuration of one and one-half inches in vertical dimension by two inches in width, giving about a two and one-half inch diagonal on the rectangle. The reflected reading light is of sufficient intensity to allow a good clear image of this relatively small area display to be expanded and projected on a screen in dimensions of as much as fifteen by twenty feet, for example.

As previously mentioned, this type of prior art fixed position illumination has a number of problems which in general limit operation of the liquid crystal light valve projector and decrease its efficiency. Much of the fixed area light falls outside of the active area of the liquid crystal and thus is totally wasted. For example, assuming a uniform illumination density and a 3:4 aspect ratio of a normal television set and of many computer displays, 38.4% of a fixed circular uniform light having a diagonal dimension equal to or slightly larger than the active area diagonal falls outside of the active raster scan so that nearly 40% of the input reading light is lost. Moreover, in many optically addressed liquid crystal light valve projection systems the input light is provided in a conventional raster scan, such as produced by a conventional television set. In such a conventional scan the horizontal scan velocity is very high, but vertical scan velocity provides but 60 fields a second. The conventional scan effectively moves vertically down the screen in a line by line scan. Accordingly, the fixed illumination by reading light of the prior art liquid crystal light valve projector illuminates areas of the light valve raster scan after a particular line has been written. After each scan line is written, the activated screen area decays in intensity from the intensity of its freshly written condition. Since the output of the liquid crystal light valve depends in part upon the intensity of the input or writing illumination, the fixed reading illumination of the prior art will cause perceived brightness and contrast to be reduced by a factor of more than two for fast light valves when used with real time video.

FIG. 6 illustrates the temporal light pattern of reflected reading light located at the start of the raster in a typical liquid crystal light valve, showing reflected light intensity vertically against field time (field of the input raster) along the horizontal axis. It will be seen that the reflected light intensity peaks at a point indicated at 46 shortly after the beginning of the field time. The delay in the peak with respect to the beginning of the field time represents the response time of the liquid crystal, since the output intensity of the latter actually peaks a short time after it receives its maximum stimulation. This intensity peak 46 moves vertically with the vertical writing light beam. FIG. 6 thus indicates the temporal decay that further decreases efficiency of the fixed reading illumination of the prior art.

In accordance with principles of the present invention, as illustrated in one particular embodiment thereof, a fixed reading illumination beam is replaced by a shaped moving reading illumination beam. The shaped illumination beam is applied only to an area of the liquid crystal light valve that is less than the entire active area, so that this smaller area reading light illumination is caused to track or move in synchronism with the writing light input. Preferably no part of the shaped reading light falls outside of the liquid crystal active area. Specifically, with a rectangular raster writing scan in the form of a line of input light that effectively moves vertically on the Screen line by line, the reading light is also configured to provide a narrow horizontal line or band that illuminates an area of the liquid crystal that is simultaneously being illuminated by the input writing light. This band of reading illumination is caused to move vertically across the active area of the liquid crystal in synchronism with the vertical scan motion of the input rectangular scan raster.

There are a number of different optical and optical/mechanical systems that may be employed to provide a narrow line or band of illumination that scans the light valve reading face in synchronism with the rectangular raster scan of the input writing light. These include both refractive and reflective elements. For example, one could use a galvanometer operated oscillating mirror.

However, because of the size and mass of the oscillating mirror, a line of light of sufficient width may be difficult to obtain with adequate scan speeds. Accordingly, it is presently preferred to use one or more of several different types of rotary devices. FIG. 1 illustrates one such rotary device with further details of its optical elements shown in FIGS. 2, 3, 4 and 5. According to one embodiment of the present invention, there is interposed between the arc lamp 16, more specifically, between the reflective cold mirror 20 and the input of the polarizing prism at ultraviolet filter 24, a beam shaping and scanning mechanism. This mechanism comprises a rotatably mounted wheel 52 driven about an axis 53 by a motor 54 and bearing on its outer periphery a plurality of transparent lens elements 56,58,60 respectively (FIGS. 1, 2 and 3). The three lens elements extend around the periphery of the wheel in a narrow peripheral and concentric band, as can be seen in FIG. 2. Each is formed, in this refractive embodiment, of a quasi cylindrical lens that is bent around and secured to the periphery of the flat side of the wheel. The wheel is transparent over the areas of the lens elements to allow light to be transmitted through the lens elements.

Each lens has a width in the direction of the radii of the wheel that is uniform but has a thickness in a direction parallel to the rotation axis of the wheel that increases from one end, such as end 62 of lens element 56, to a maximum at a center point and then decreases uniformly to a similar minimum at the opposite end 64 of the same lens element 56. The change in thickness is preferably in the form of a smooth curve, as illustrated in FIG. 3, which shows thickness of the lens element tapering in a smooth curve from a minimum at edge 62 to a maximum at a midpoint 68 and thence decreasing in a smooth curve to the other end of this lens element 64. Accordingly, each lens element has a varying refractive angle along its length. The three light bending lens elements in this embodiment, which may be considered to be a black and white embodiment for example, are each identical and each transparent, with no color filtering or color changing characteristics or coatings. The three light bending elements 56, 58 and 60, each extending 120° around the wheel, are positioned in a circular train, end to end, so that as the wheel rotates each in turn is interposed and moved in a circular path whose plane is perpendicular to the reading light axis.

Interposed between the light path and the train of lens elements is a fixed position negative cylindrical lens 70 (FIG. 1) that has little effect upon the slowly converging beam from bending element 56 in the vertical or scan direction, but which, in the horizontal or orthogonal direction, causes the beam to diverge as shown in FIGS. 4 and 5. A plano-convex lens 72 collimates the divergent axis of the beam and causes the beam in its scanning direction (the vertical direction) to converge more rapidly to a line or narrow band at the active area of the output face of the light valve. Thus, as illustrated in FIG. 4, the high intensity reading light reflected from the arc lamp is basically collimated as it passes through lens element 56, and thence impinges upon negative cylindrical lens 70. The latter causes the beam to diverge as it is transmitted to plano-convex lens element 72, which, in turn, directs the diverged or horizontally spread beam into a wide beam that extends substantially across the entire width of the active area of the liquid crystal 10.

As can be seen in the orthogonal view of FIG. 5, a lower part of the downwardly (as viewed in FIG. 5) moving light bending lens element 56 receives incoming light and refracts it according to the particular angle of its forward surface 76. The lower part of the lens element refracts the beam upwardly toward the top of the elongated negative cylindrical lens 70 in a slightly vertically converging path to be refracted through an upper portion of plano-convex lens 72, which further narrows the vertical dimension of the beam to cause it to impinge in a relatively narrow band that extends across the width of a liquid crystal 10.

Also illustrated in FIG. 5 in dotted lines is the position of the lens element 56 relative to the light beam after the lens element has moved downwardly to cause the incoming light beam to strike an upper portion of the lens element. Thus it will been that as the wheel rotates, the light bending element 56 moves downwardly, in this exemplary illustration, across the path of the light beam so that in an initial position the light beam is bent upwardly to impinge upon an upper end of the liquid crystal active area. As the bending element moves downwardly, the bending of the light beam is changed so that the narrow band of impingement of the light beam upon the liquid crystal active area moves downwardly from its area of impingement near the top of the liquid crystal, as illustrated in solid lines, to an area of impingement at the bottom of the liquid crystal, as illustrated in phantom lines in FIG. 5.

Figure 7:
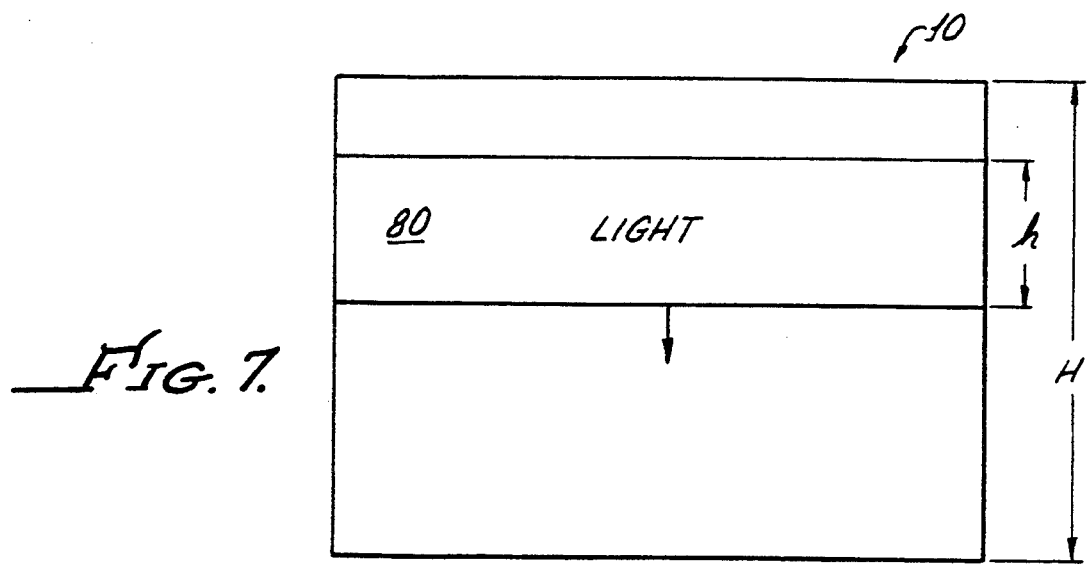
FIG. 7 is a view of a rectangular liquid crystal face illustrating its illumination by a narrow band of light synchronized with a vertical scan.

Illustrated in FIG. 7 is the narrow band 80 of light that is achieved by the illustrated mechanical/optical light bending lens elements shown in FIGS. 1, 2, 3, 4, and 5. Although a more narrow band of light is theoretically more efficient, limitations of actual equipment, including the relatively large size of the light source and the light elements themselves, dictate that the relatively narrow band of light provided by the described optical and mechanical elements has a vertical dimension in the order of $\frac{1}{3}$ to $\frac{1}{2}$ of the vertical dimension H of the liquid crystal light valve active area. The vertical dimension of the narrow light band is indicated by reference character h. The vertical height h of the horizontal light band 80, may be decreased by employing a narrow horizontally extending slit to limit the size of the light source. However, such an arrangement would decrease efficiency of use of the light source because of the lost light that is blocked and prevented from passing through the slit. Nevertheless, the narrower beam will provide even greater contrast in the output illumination of the liquid crystal light valve so that there may be a useful tradeoff depending upon desired parameters and operation of the system, wherein an increased contrast obtained by employing a slit to further decrease reading light height is preferred even at the cost of some additional loss of efficiency. The actual effective height of the band 80 is significantly decreased by the fact that light intensity across the height of the band has a Gaussian distribution that peaks at the band centerline.

It will be seen, as viewed in FIG. 2, that effectively there is provided a train of end to end light bending elements, circular in form in this embodiment, which are moved so as to be successively interposed at varying angles as each lens element moves between the light source and the display to refract the beam and cause the horizontally wide, vertically narrow beam to scan vertically between the top and bottom of the liquid crystal area. The refracted beam is shaped into a relatively narrow band or line of light at the light valve by the described negative cylindrical lens and the plano-convex lens which collimates the divergent axis of the beam. Width of the reading light scanning line is narrowest when all of the light rays of the beam impinging on the scan wheel are collimated.

From the temporal variation of light intensity for any fixed position, as shown in FIG. 6, it can be seen that intensity of the average reflected light over one field time is much less than intensity of the peak reflected light. According to the present invention, the reading light is compressed vertically, in the vertical scan direction, as shown in FIG. 7, and tracks the peak of light valve response as it moves vertically with the scan of the writing light. This raises the average reflected light over the field time of the input raster at any given point nearly to the previous peak value. Although the reading illumination moves in synchronism with the writing illumination, it is actually preferably moved at a location slightly behind the position of the writing light illumination so as to track more closely the moving peak of light valve response, rather than the moving peak of input writing scan. As previously mentioned, the peak of light valve output response, as shown in FIG. 6, is slightly behind the writing input raster scan.

The "contrast" in the output of the liquid crystal light valve (which is reduced by the temporal decay of intensity) is the ratio of the intensity of light reflected from an area of a liquid crystal .illuminated by input light compared to the intensity of light reflected from an area of the liquid crystal that is "dark" or not illuminated by input light.

When the liquid crystal light valve receives no input light, there is still a small amount of light reflected at the output side, that is, it still reflects somewhat in the "dark" condition. The average output light divided by the off state or "dark" state light determines the contrast ratio of the projected image. Because the average output light is raised by the synchronized scanning of reading light described herein, but much of the off state or "dark" state light is not affected (because the liquid crystal is constantly in the orientation which gives minimum projected light), the contrast ratio of the output illumination is also increased by the techniques describes herein. As previously noted, the distribution of reading light intensity over the relatively narrow width of the reading band 80 is of a Gaussian nature, so that the true peak intensity of the narrowed band of reading light impinging on the liquid crystal is of even smaller vertical extent.

Motor 54 is operated under control of a wheel rotation control circuit 92 (FIG. 1), which receives synchronizing signals from a cathode ray tube control circuit 94. The latter provides horizontal and vertical scan control signals on lines 96,98 to control the rectangular raster scan of the cathode ray tube. The control circuit also provides a vertical sync signal on a line 100, and a multiplied sync signal, such as a signal having three pulses for each vertical sync, on a line 102. Signals on lines 100 and 102 are provided as reference signals to wheel rotation control circuit 92, which receives speed sensing signals from pickoffs 104,106 on the output shaft of motor 54. The pick offs provide a signal on a line 108 representing one pulse per rotation and a signal on a line 110 representing one pulse for each one of the three light bending lens elements on the wheel.

Figure 8:
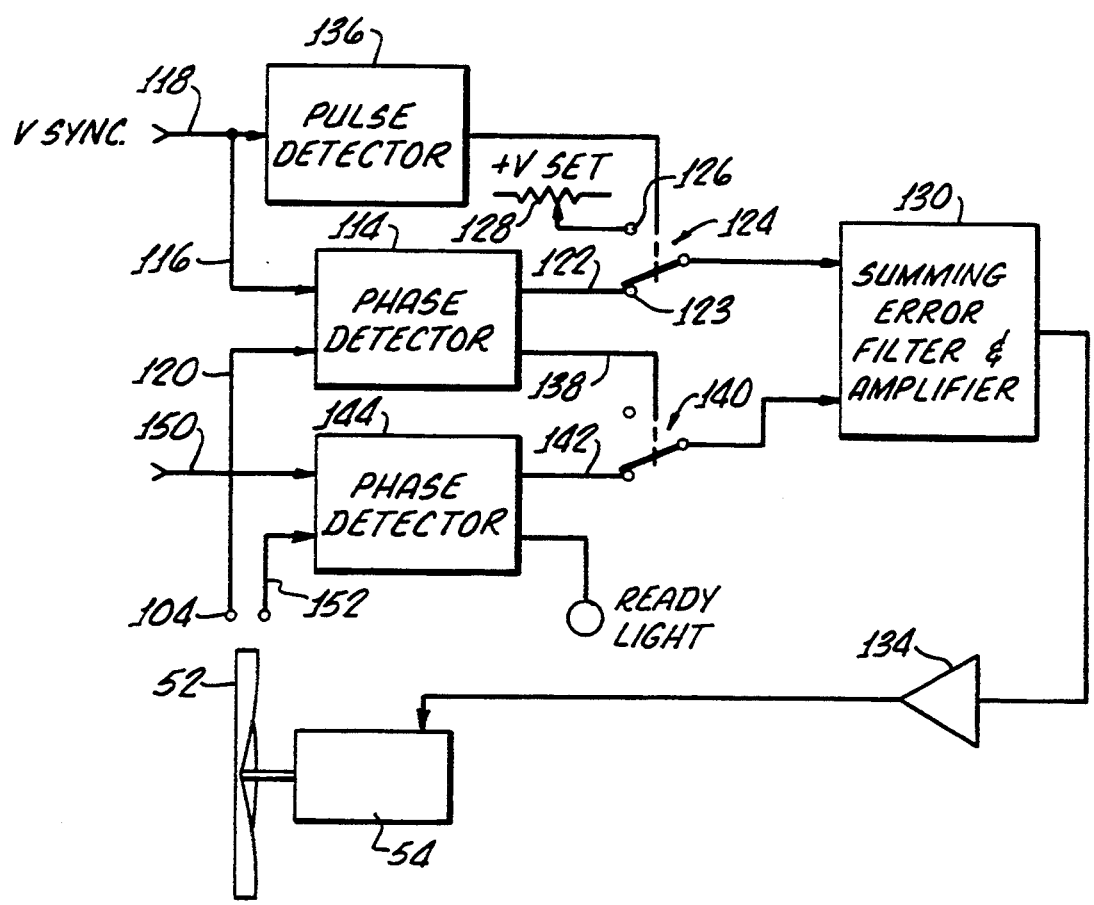
FIG. 8 is a simplified block diagram of an electronic control for the rotating wheel.

Further details of wheel control circuit 92 are illustrated in FIG. 8, which shows a first phase detector 114 having a reference input on line 116 from the vertical sync pulse of the CRT control circuit on line 118 and a variable input on line 120 from the pickoff 104 that provides one pulse per wheel rotation. Initially a first output on a line 122 of phase detector 114 is provided to a first terminal 123 of a switch 124, having a second terminal 126 connected via an adjustment potentiometer 128 to a fixed source of potential. Initially the switch is connected to the fixed source of potential and provides an output via a summing error filter and amplifier 130 through a motor power amplifier 134 to the motor 54. Motor 54 may be, for example, a brushless DC motor that drives the wheel 52 with a controlled speed that is to be synchronized with the vertical field of the CRT.

Upon occurrence of a vertical sync pulse on line 118, a pulse detector 136 operates switch 124 to move it to its second position so that phase detector 114 now will send a speed control signal via amplifier 130 to the motor that locks the motor rotation speed to the vertical synchronization of the writing input from the CRT. The motor lock to the vertical sync rate and phase causes a lock signal on a second output line 138 of phase detector 114, which operates a second switch 140 to connect the output on a line 142 of a second phase detector 144 to the input of summing error filter and amplifier 130. The second phase detector 144 receives a reference input on line 150 that is the three pulse per revolution signal on line 102 of FIG. 1, derived from the cathode ray tube control electronics, which may be merely a plurality of pulses equally spaced between successive vertical sync pulses to provide three pulses per revolution. A reference input to the second phase detector 144 is provided on an input line 152 from a group of pickoffs on the rotating wheel arranged to provide one pulse at each intersection of the three successive 120° light, bending elements wheel. Thus the dual phase detector arrangement ensures first that the wheel speed be such as to cause each of the three light bending lens elements of a train of elements on the wheel to traverse the light beam path with the same speed as the vertical scan of the writing input, and, second, that a selected one of the respective lens elements moves in phase with the vertical sync pulse.

Figure 9:
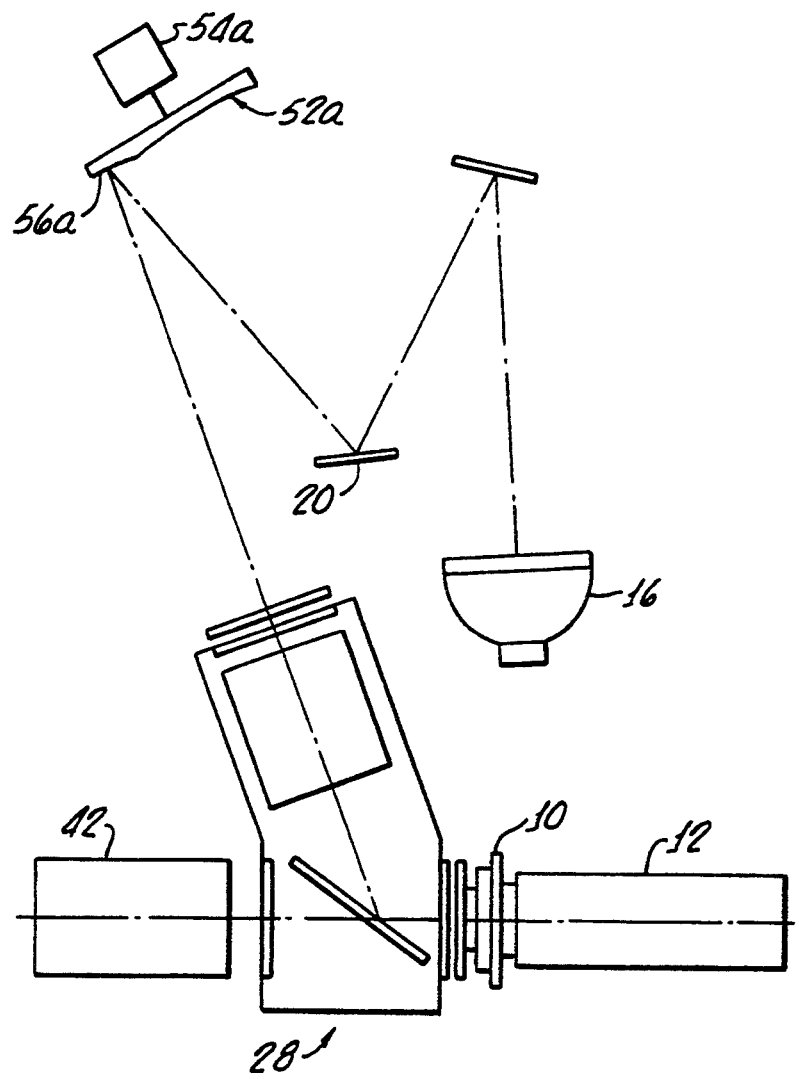
FIG. 9 illustrates an embodiment of the invention illustrated in FIG. 1 employing reflective light bending elements.
Figure 10:
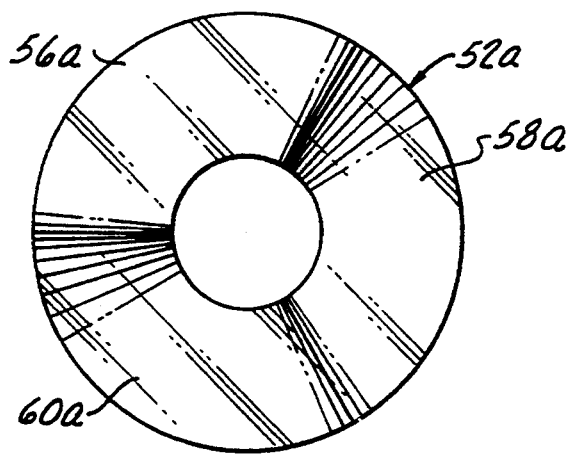
FIG. 10 shows a wheel having reflective light bending elements.
Figure 11:
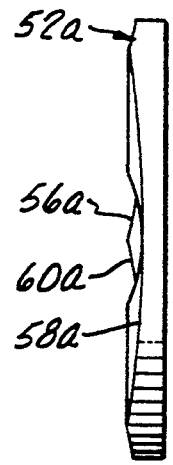
FIG. 11 is a side view of the reflective wheel of FIG. 10.

Illustrated in FIG. 9 is an arrangement where light bending elements comprise reflective rather than refractive elements. The arrangement of FIG. 9 employs the same major projection components as does the arrangement of FIG. 1, including the liquid crystal light valve 10, CRT 12, MacNeille prism 28, output projection lens 42, and xenon arc lamp 16 with its cold mirrors 18 and 20. In this arrangement also there is a wheel 52a corresponding to wheel 52 of FIG. 1, driven by a motor 54a and having a plurality of reflective lens elements 56a, 58a, 60a (FIGS. 10 and 11) corresponding to the similarly numbered refractive elements of FIG. 1. In this system each bending element is mounted on one side of the wheel and has a continuously changing different reflective angle (as the wheel rotates) analogous to the continuously changing refractive angle elements of FIGS. 1 and 2. Consequently, light from the arc lamp is reflected in a repetitive vertical scanning pattern as the wheel 52a rotates. The vertically scanning light is spread horizontally by the negative cylindrical lens element 70a, and thence fed through the plano-convex lens element 72a, just as previously described in connection with FIG. 1. Electronic control for the wheel with the three reflective elements is the same for both the reflective and refractive embodiments.

The light bending elements of the arrangements of FIGS. 1 and 9 as described to this point may be free of any color imparting characteristics so that the video projection will be in black and white and shades of gray. However, the elements are grouped in threes, with a total number of elements on the wheel that is three or some integral multiple of three, so that successively different ones of the elements may be made of successively different ones of the three primary red, green and blue colors. Such a color system is employed where the cathode ray tube provides a sequential color scan, scanning red, blue and green fields in sequence, and employing 180 fields per second. The red, green and blue fields can be non-interlaced or interlaced with another set of red, green and blue fields to provide a single frame. Where the projector is to be a color projector, the refractive bending elements 56, 58 and 60 are provided with suitable color coatings on the flat face thereof, namely that face which is against the wheel (the various elements are fixedly mounted on the flat surface of the wheel). So, too, the reflective elements may be suitably coated with color selecting reflective coatings, so that the reading light that is caused to illuminate the liquid crystal active area changes in color from field to field in sequence, with the three color sequence repeating for each wheel rotation or several times per rotation.

It will be readily understood that, although a train of three light bending elements, each extending for 120° around the periphery of the wheel, has been illustrated, if a color arrangement is desired, the number of bending elements may be any integral multiple of three, with the length of each element being proportionately less so that a train of six, nine or twelve or more elements are positioned end to end, forming a continuous circular train of bending elements that are successively interposed between the light source and the liquid crystal as the wheel rotates. In such a situation, where more than three light bending elements are employed on a single wheel, the speed of the wheel is proportionately decreased so that the traverse of each individual element, or more specifically the traverse of the reading beam deflection caused by each specific individual element, is synchronized with a full vertical scan of the input writing raster. Thus, although rotational speed of the wheel is not a limiting factor, the rotational speed is decreased as the number of groups of three different color elements of the train increases.

What is claimed is:

1. In a liquid crystal light valve wherein a liquid crystal is optically addressed by an input write beam that scans the area of said liquid crystal writing scan, and wherein high intensity reading light illuminates the active area of said liquid crystal to be reflected for display, an improved method for illuminating said liquid crystal active area comprising:
   projecting a high intensity reading light to illuminate part of the active area of said liquid crystal, and
   scanning said illuminated area over said liquid crystal in synchronism with said writing scan;
   wherein said steps of projecting and scanning comprise providing a high intensity light source projecting reading light from said source to said liquid crystal, providing a train quasi cylindrical light bending elements, and moving said light bending elements in sequence between said light source and said liquid crystal.

2. The method of claim 1 wherein said input write beam scans in a line by line writing scan, and wherein said step of scanning said illuminated area comprises scanning a band of reading light in synchronism with said writing scan.

3. The method of claim 1 wherein said step of providing a train of light bending elements comprises providing elongated refractive lens elements having varying refractive angles along their length.

4. The method of claim 1 wherein said step of providing light bending elements comprises providing elongated reflective lens elements having varying reflective angles along their length.

5. The method of claim 1 including the step of synchronizing the moving of said light bending elements with said writing scan.

6. The method of claim 1 wherein said step of projecting comprises shaping the projected reading light to a narrow elongated area at said liquid crystal active area.

7. The method of claim 1 wherein said step of providing light bending elements comprises mounting a plurality of circularly curved quasi cylindrical lens elements on a wheel and wherein said step of moving said lens elements in sequence comprises rotating said wheel.

8. The method of claim 1 wherein said steps of projecting and scanning comprise shaping said reading light to a narrow band and repetitively bending said shaped reading light to cause it to scan said liquid crystal active area in synchronism with said writing scan.

9. The method of claim 8 wherein said bending comprises repetitively refracting said reading light.

10. The method of claim 8 wherein said bending comprises repetitively reflecting said reading light.

11. The method of claim 1 wherein said step of providing a train of light bending elements comprises providing a train of light bending elements of sequentially different colors.

12. In a liquid crystal light valve having an input face that is scanned with a scan of input illumination and having an output face with an active area for receiving reading illumination, a method for illuminating said output face comprising:
   projecting at said output face a reading light beam having a cross section defining a reading area that is smaller than the area of said output face, and
   moving said area of reading light over said output face in synchronism with said scan of input illumination:
   wherein said steps of projecting and moving comprise providing a high intensity light source, projecting reading light from said source to said liquid crystal, providing a train of quasi cylindrical light bending elements, and moving said light bending elements in sequence between said light source and said liquid crystal.

13. The method of claim 12 wherein said step of projecting comprises providing a circular array of individual beam bending elements, projecting a beam of reading light to a portion of one of said elements, and rotating said array relative to said beam to cause said beam to traverse said elements in synchronism with said raster scan of input illumination.

14. The method of claim 12 wherein said input face is scanned with a line of input illumination that moves over said input face, and wherein said step of projecting comprises shaping said beam of reading light into a narrow band.

15. The method of claim 13 wherein said input face is scanned with a line of input illumination that moves over said input face, and including the step of shaping said projected beam of reading light into a band after it is bent by said beam bending elements.

16. The method of claim 15 wherein said array is rotated to synchronize motion of each of said bending elements, individually, with said raster scan of input illumination.

17. A liquid crystal light valve projector comprising:
an input face and an output face having an active area,
means for scanning said input face with a raster scan of input illumination, and
means for illuminating said output face active area comprising:
means for projecting at said output face a projection area of reading light that is smaller at said output face than the active area of said output face, and
means included in said means for projecting for moving said projection area of reading light over said output face active area in synchronism with said scan of input illumination:
said means for projecting including high intensity light source for projecting reading light from said source to said liquid crystal, means for providing a train of quasi cylindrical light bending elements and means for moving said light bending elements in sequence into position between said light source and said liquid crystal.

18. The projector of claim 17 wherein said means for moving said projection area of reading light scan comprises a wheel, means for rotating the wheel in synchronism with said scan of input illumination, and a plurality of light bending elements on said wheel and positioned to bend said reading light to different parts of said liquid crystal active area as the wheel rotates.

19. The liquid crystal projector of claim 18 wherein said light bending elements comprise a train of light refractive elements positioned in end to end relation on said wheel.

20. The projector of claim 18 wherein said light bending elements comprise a train of light reflective elements positioned in end to end relation on said wheel.

21. The projector of claim 19 wherein said scan of input illumination includes a plurality of successive fields, wherein said bending elements of said plurality of bending elements are formed in at least one group of three, and wherein each of said bending elements of said one group has a different color, whereby the reading light impinging upon said liquid crystal active area is a different color for each field of each group of three successive fields.

22. The projector of claim 19 wherein said means for scanning said input face with a scan includes an input raster scan control having a vertical sync signal, and wherein said means for moving said projection area of reading light comprises means for rotating said wheel at a speed synchronized from said vertical sync signal.

23. A liquid crystal light valve projector comprising:
liquid crystal light valve having an input face and having an output face with an active area,
means for optically addressing the liquid crystal light valve by an input light beam that scans said input face in a writing scan, and
high intensity reading light projecting means for illuminating said output face to provide a reflected image for display, said high intensity reading light means comprising:
high intensity light source means for generating a high intensity projection beam,
means for shaping said projection beam into a reading beam having a reading area smaller than said active area of said output face, and
means for causing said reading area to scan said active area in synchronism with said writing scan:
said means for projecting including high intensity light source for projecting reading light from said source to said liquid crystal, means for providing a train of quasi cylindrical light bending elements and means for moving said light bending elements in sequence into position between said light source and said liquid crystal.

24. The projector of claim 23 wherein said means for shaping comprises means for shaping said projection beam into a narrow band of reading light.

25. The projector of claim 23 wherein said means for shaping comprises a negative cylindrical lens.

26. The projector of claim 23 wherein said means for shaping comprises a negative cylindrical lens and a planoconvex lens.

27. The projector of claim 24 wherein said means for optically addressing includes means for causing said input light beam to scan said input face in a line by line writing scan, and wherein said means for causing said reading area to scan comprises scanning said narrow band of reading light in synchronism with said line by line writing scan.

28. The projector of claim 23 wherein said means for causing said reading area to scan said active area comprises a wheel, a plurality of narrow elongated light bending elements on an outer circumferential portion of said wheel and positioned in end to end relation along said circumferential portion, said circumferential portion and said bending elements being interposed between said liquid crystal active area and said light source means, and means responsive to said means for optically addressing for rotating said wheel in synchronism with said writing scan.

29. In a liquid crystal light valve wherein a liquid crystal is optically addressed by an input write beam that scans the area of said liquid crystal in a writing scan, and wherein high intensity reading light illuminates the active area of said liquid crystal to be reflected for display, an improved method for illuminating said liquid crystal active area comprising:
projecting a band of reading light to illuminate less than the entire active area of said liquid crystal, and
moving said band of reading light over said liquid crystal in synchronism with said writing scan such that the band of reading light illuminates the scanned area of said liquid crystal as it is being optically addressed by said input write beam, wherein said steps of projecting and moving comprise shaping said reading light to a narrow band and repetitively bending said shaped reading light to cause it to scan said liquid crystal active area in synchronism with said writing scan.

30. The method of claim 29 wherein said bending comprises repetitively refracting said reading light.

31. The method of claim 29 wherein said bending comprises repetitively reflecting said reading light.

* * * * *

UNITED STATES PATENT AND TRADEMARK OFFICE
CERTIFICATE OF CORRECTION

PATENT NO. : 5,398,082
DATED : March 14, 1995
INVENTOR(S) : Henderson et al.

It is certified that error appears in the above-indentified patent and that said Letters Patent is hereby corrected as shown below:

| | |
|---|---|
| Colmn 1, line 50 | Please delete "Jacobsend" and insert therefor --Jacobsen--. |
| Column, 8, line 34 | Please delete (first occurence) ",". |
| Column 9, line 50 Claim 1 | After the word "crystal", please insert therefor --in a--. |
| Column 9, line 60 Claim | After the word "source", please insert therefor --,--. |
| Column 9, line 62 Claim 1 | After the word "train", please insert therefor --of--. |

Signed and Sealed this

Ninth Day of July, 1996

Attest:

BRUCE LEHMAN

*Attesting Officer*     *Commissioner of Patents and Trademarks*